J. T. CLARKE.
ROD PACKING.
APPLICATION FILED JULY 22, 1918.

1,289,664.

Patented Dec. 31, 1918.

Inventor
John T. Clarke

UNITED STATES PATENT OFFICE.

JOHN T. CLARKE, OF CHICAGO, ILLINOIS.

ROD-PACKING.

1,289,664.  Specification of Letters Patent.  Patented Dec. 31, 1918.

Application filed July 22, 1918.  Serial No. 246,196.

*To all whom it may concern:*

Be it known that I, JOHN T. CLARKE, a citizen of the United States, residing at Chicago, in the county of Cook and State of Illinois, have invented new and useful Improvements in Rod-Packings, of which the following is a specification.

This invention relates to devices for preventing leakage along piston, pump and other rods where they pass out of the cylinder, and its object is to provide a novel and improved packing which is simple and inexpensive, and which can be easily applied and renewed, and which effectually serves the purpose for which it is designed.

With the object stated in view, the invention consists in a combination and arrangement of parts to be hereinafter described and claimed, and in order that the same may be better understood, reference is had to the accompanying drawing forming a part of this specification.

Figure 1:
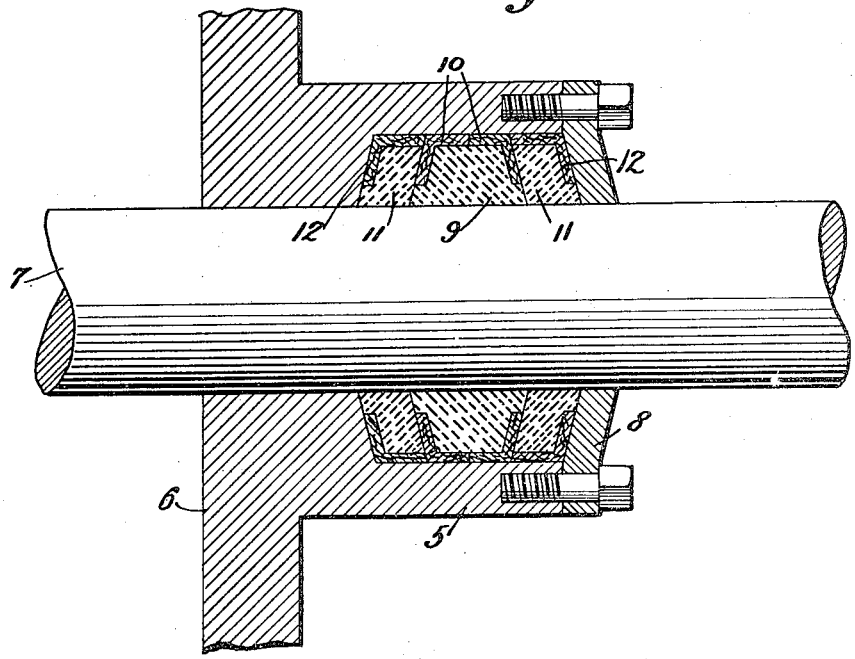
Figure 1 is a sectional view of the packing.
Figure 2:
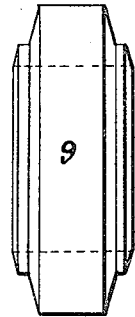
Figs. 2 to 4 are edge views of certain members of the packing.
Figure 3:
Figure 4:
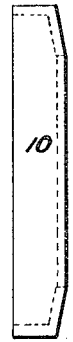

Referring specifically to the drawing, 5 denotes a stuffing box at the end of a cylinder 6. The stuffing box contains a packing to prevent leakage along the rod 7 passing therethrough. The outer end of the stuffing box is provided with a closure which may be a cap 8, the same being bolted on or otherwise suitably secured.

The packing hereinbefore referred to consists of a main packing ring 9 seating in the stuffing box 5 and encircling the rod 7. This ring is composed of Babbitt or other soft metal. As shown in the drawing, the ring has oppositely inclined faces and it is therefore tapered or wedge-shaped in cross-section, the taper being outward toward the outer periphery of the ring, so that the widest portion of the ring is at its inner periphery which is in contact with the rod 7.

The ring 9 is fitted with a thin sheath of rubber composition or other suitable packing material, consisting of two cup-shaped members 10 fitting the faces of the ring and the outer periphery thereof. The sheath is thus made in two parts so that it can be readily assembled over the ring. The sheath does not completely cover the faces of the ring a portion of the inner surfaces next to the rod 7 being left bare.

The packing ring 9, with its sheath 10, is of such diameter that it fits snugly in the stuffing box 5 between the side wall thereof and the rod, the portions of the sheath which fit the outer periphery of the ring being in contact with said wall. The width of the ring is however such that it does not fill up the stuffing box from end to end, so that there is left a space on each side of the ring for an auxiliary metal packing ring 11. One of these rings fits snugly between the inner end of the stuffing box and the rear face of the ring, and the other one fits snugly between the cover 8 and the outer face of the ring 9. Each ring 11 is also provided with a composition sheath 12 partly covering the outer face thereof as well as the outer periphery, the latter portion of the sheath being in contact with the side wall of the stuffing box 5. It will be noted that where the sheaths 10 and 12 fit the faces of the packing rings, the latter are recessed to accommodate the same. The rings 11 are dished to conform to the sloping faces of the rings 9.

After the packing rings are assembled around the rod 7, and the cover 8 is applied, the rings are held firmly around the rod, whereby leakage along the same is effectually prevented. The composition shells 10 and 12 allow the packing rings 9 and 11 to yield as the rod 7 backs, thereby preventing binding, and as they crowd during this action, radial leakage is prevented. The device can be readily applied to standard stuffing boxes without the use of new fittings or resorting to radical changes.

I claim:

1. A rod packing comprising a main packing ring encircling the rod and tapered in cross-section in the direction of its outer periphery, auxiliary packing rings seating against the opposite faces of said ring, sheaths covering a portion of the faces of the main ring and extending over the outer periphery thereof, and sheaths covering a portion of the outer faces of the auxiliary rings and the outer peripheries thereof.

2. A rod packing comprising a main metallic packing ring encircling the rod and tapered in cross-section in the direction of its outer periphery, auxiliary metallic packing rings seating against the opposite faces of said ring, composition sheaths covering a portion of the faces of the main ring and extending over the outer periphery thereof, and composition sheaths covering a portion of the outer faces of the auxiliary rings and the outer peripheries thereof.

In testimony whereof I affix my signature.

JOHN T. CLARKE.

Copies of this patent may be obtained for five cents each, by addressing the "Commissioner of Patents, Washington, D. C."